United States Patent
Lee et al.

(10) Patent No.: US 11,092,692 B2
(45) Date of Patent: Aug. 17, 2021

(54) APPARATUS AND METHOD FOR RECOGNIZING LOCATION IN AUTONOMOUS VEHICLE

(71) Applicants: Hyundai Motor Company, Seoul (KR); Kia Motors Corporation, Seoul (KR)

(72) Inventors: Hae Ryong Lee, Gyeonggi-do (KR); Kang Hoon Lee, Gyeonggi-do (KR); Woo Joong Kim, Seoul (KR); Ji Un Kim, Gyeonggi-do (KR); Eun Jin Choi, Seoul (KR); Sung Woo Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/693,240

(22) Filed: Nov. 23, 2019

(65) Prior Publication Data
US 2020/0386895 A1    Dec. 10, 2020

(30) Foreign Application Priority Data
Jun. 7, 2019   (KR) .................. 10-2019-0067229

(51) Int. Cl.
*G01S 17/931* (2020.01)
*G01C 21/36* (2006.01)
*G01S 17/89* (2020.01)

(52) U.S. Cl.
CPC ........ *G01S 17/931* (2020.01); *G01C 21/3602* (2013.01); *G01C 21/3658* (2013.01); *G01S 17/89* (2013.01)

(58) Field of Classification Search
CPC ... G01S 17/931; G01S 17/89; G01C 21/3658; G01C 21/3602
See application file for complete search history.

(56) References Cited

U.S. PATENT DOCUMENTS

| | | | |
|---|---|---|---|
| 2015/0081211 A1* | 3/2015 | Zeng | G01S 13/931 701/446 |
| 2017/0227647 A1* | 8/2017 | Baik | G01S 19/42 |
| 2018/0209802 A1* | 7/2018 | Jung | G01C 21/3602 |
| 2018/0211121 A1* | 7/2018 | Moosaei | G01S 17/931 |

FOREIGN PATENT DOCUMENTS

KR   10-2018-0106417 A   10/2018

* cited by examiner

*Primary Examiner* — Daryl C Pope
(74) *Attorney, Agent, or Firm* — Mintz Levin Cohn Ferris Glovsky and Popeo, P.C.; Peter F. Corless

(57) ABSTRACT

An apparatus for recognizing a location in an autonomous vehicle is provided. The apparatus includes a light detection and ranging (LiDAR) sensor that generates a LiDAR contour of a fixed structure located at the roadside and a LiDAR contour of a variable structure. A controller then detects a location of the autonomous vehicle based on the LiDAR contour of the fixed structure and the LiDAR contour of the variable contour, generated by the LiDAR sensor.

14 Claims, 7 Drawing Sheets

APPARATUS AND METHOD FOR RECOGNIZING LOCATION IN AUTONOMOUS VEHICLE

CROSS-REFERENCE TO RELATED APPLICATION

This application is claims the benefit of priority to Korean Patent Application No. 10-2019-0067229, filed on Jun. 7, 2019, the entire contents of which are incorporated herein by reference.

TECHNICAL FIELD

The present disclosure relates to technologies of more accurately recognizing a current location in an autonomous vehicle, and more particularly, to an apparatus and method for detecting a location of the autonomous vehicle using both of a LiDAR contour for a fixed structure and a LiDAR contour for a variable structure.

BACKGROUND

In general, a positioning device mounted within an autonomous vehicle detects a location of the autonomous vehicle based on a detailed map (e.g., digital map data) and light detection and ranging (LiDAR) data for a roadside structure (e.g., a fixed structure) included in the detailed map. In particular, a fixed structure (e.g., curb stones, soundproof walls, or the like) among roadside structures is included in the detailed map, but a variable structure (e.g., a banner, bushes, things which are piled up, or the like) is not included in the detailed map. However, since a LiDAR sensor does not classify whether the roadside structure is a fixed structure or a variable structure, it obtains LiDAR points for all structures and approximates it to generate a linear component (hereinafter referred to as "LiDAR contour"). In particular, the LiDAR contour may be generated by a controller.

Thus, an apparatus for recognizing or detecting a location in a conventional autonomous vehicle should perform a process of classifying whether a LiDAR contour obtained by a LiDAR sensor is a LiDAR contour of a fixed structure or a LiDAR contour of a variable structure (e.g., a process of filtering the LiDAR contour of the variable structure) and detects a location of the autonomous vehicle using the LiDAR contour of the fixed structure and a detailed map. When the classifying process is not performed, the LiDAR contour of the variable structure operates as noise which reduces positioning accuracy.

The apparatus for recognizing the location in the conventional autonomous vehicle matches a LiDAR contour for a fixed structure located at the roadside and a location of the fixed structure on a detailed map to recognize a location of the autonomous vehicle. Since the entire LiDAR contour of the fixed structure is not obtained since the fixed structure is hidden by a variable structure, due to a matching set being insufficient, positioning accuracy is degraded.

SUMMARY

The present disclosure provides an apparatus and method for recognizing or detecting a location of the autonomous vehicle using both of a LiDAR contour for a fixed structure and a LiDAR contour for a variable structure without the necessity of classifying whether a LiDAR contour obtained by a LiDAR sensor is the LiDAR contour for the fixed structure included in a detailed map or the LiDAR contour for the variable structure which is not included in the detailed map to enhance positioning accuracy.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus may include: a light detection and ranging (LiDAR) sensor configured to generate a LiDAR contour of a fixed structure located at the roadside and a LiDAR contour of a variable structure and a controller configured to detect a location of the autonomous vehicle based on the LiDAR contour of the fixed structure and the LiDAR contour of the variable contour, the LiDAR contours being generated by the LiDAR sensor.

The apparatus may further include a storage configured to store a detailed map including the fixed structure and a reference offset of a LiDAR contour for each layer in each window region. The controller may be configured to determine whether to store the reference offset based on a reliability value obtained at a time when the reference offset is generated. The reliability value may be a value corresponding to an error between a location of a real or actual lane and a location of an estimated lane.

The controller may include an offset calculator configured to detect a LiDAR contour for each layer matched with the fixed structure using a matching window, divide the matching window into a plurality of window regions, determine a representative point of a LiDAR contour for each layer in each of the plurality of window regions, generate a location offset that represents each of the plurality of window regions by fusing offsets of the representative points, generate one location offset representing one roadside structure by fusing location offsets representing the plurality of window regions, and generate a final location correction value by fusing location offsets representing respective roadside structures and a positioning device configured to detect a current location of the autonomous vehicle based on the final location correction value.

The offset calculator may be configured to calculate a location offset of each of the representative points based on a location of the fixed structure on the detailed map. The offset calculator may be configured to equally divide the matching window into the plurality of window regions. The offset calculator may also be configured to determine a point at which a horizontal line passing through the center of each of the plurality of window regions and a LiDAR contour in the window region are met as a representative point and determine the center of a LiDAR contour in each of the plurality of window regions as a representative point.

According to another aspect of the present disclosure, a method may include: generating, by a LiDAR sensor, a LiDAR contour of a fixed structure located at the roadside and a LiDAR contour of a variable structure and detecting, by a controller, a location of the autonomous vehicle based on the generated LiDAR contour of the fixed structure and the generated LiDAR contour of the variable contour.

The method may further include storing, by a storage, a detailed map including the fixed structure and a reference offset of a LiDAR contour for each layer in each window region. The storing of the reference offset may include storing the reference offset, when a reliability value obtained at a time when the reference offset is generated is greater than a threshold. The reliability value may be a value that corresponds to an error between a location of a real or actual lane and a location of an estimated lane.

The detecting of the location of the autonomous vehicle may include detecting a LiDAR contour for each layer matched with the fixed structure using a matching window, dividing the matching window into a plurality of window regions, determining a representative point of a LiDAR contour for each layer in each of the plurality of window regions, generating a location offset representing each of the plurality of window regions by fusing offsets of the representative points, generating one location offset that represents one roadside structure by fusing location offsets representing the plurality of window regions, generating a final location correction value by fusing location offsets representing respective roadside structures, and detecting a current location of the autonomous vehicle based on the final location correction value.

The generating of the location offset representing each of the plurality of window regions may include calculating a location offset of each of the representative points based on a location of the fixed structure on the detailed map. The matching window may be divided equally into the plurality of window regions. Additionally, the determining of the representative point may include determining a point at which a horizontal line passing through the center of each of the plurality of window regions and a LiDAR contour in the window region are met as a representative point and may include determining the center of a LiDAR contour in each of the plurality of window regions as a representative point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
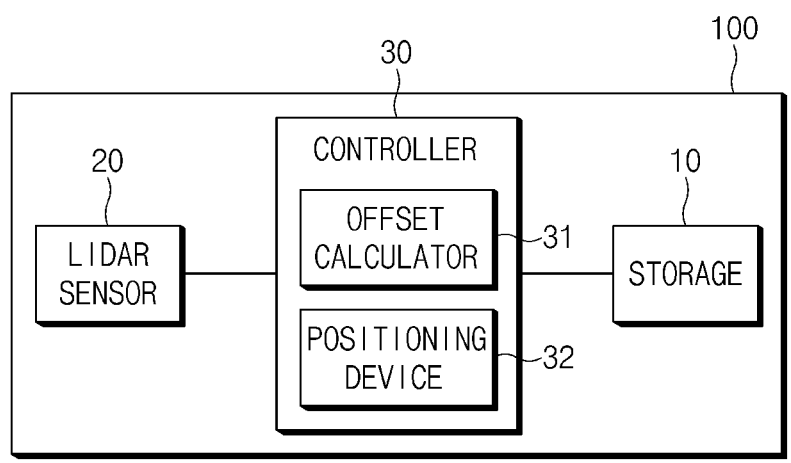
FIG. 1 is a block diagram illustrating a configuration of an apparatus for recognizing a location in an autonomous vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for recognizing a location in an autonomous vehicle according to an exemplary embodiment of the present disclosure. As shown in FIG. 1, an apparatus 100 for recognizing a location in an autonomous vehicle according to an exemplary embodiment of the present disclosure may include a storage 10, a light detection and ranging (LiDAR) sensor 20, and a controller 30. In particular, the respective components may be combined with each other to form one component and some components may be omitted, depending on a manner which executes the apparatus 100 for recognizing or detecting the location in the autonomous vehicle according to an exemplary embodiment of the present disclosure.

Seeing the respective components, first of all, the storage 10 may be configured to store a map that includes a roadside structure (e.g., a fixed structure). The map may include a detailed map component (e.g., a location, a distance, a roadside, or the like) of the fixed structure. The storage 10 may be configured to store a reference offset of a LiDAR contour matched with the fixed structure included in the detailed map. In particular, the reference offset may refer to a value for moving the LiDAR contour to a location of the fixed structure. Furthermore, the matching may refer to a process of selecting a LiDAR contour, located within a particular distance from the location of the fixed structure, where a heading angle offset is less than a threshold.

When the entire window region for matching the fixed structure included in the detailed map and a LiDAR contour is divided (e.g., when the entire window region is equally divided), the storage 10 may be configured to store a value (e.g., a reference offset) for moving a representative point on a LiDAR contour set for each window region to a location of the fixed structure. In particular, the storage 10 may be configured to store a different reference offset for each laser radiation layer of the LiDAR sensor 20 in each window region.

The storage 10 may be configured to store various logics, algorithms, and programs, which are required in a process of recognizing a location of an autonomous vehicle using both of a LiDAR contour for a fixed structure and a LiDAR contour for a variable structure. In particular, the variable structure may refer to all objects which are excluded from targets for constructing a map due to variability of a location thereof.

The storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The LiDAR sensor 20 may be configured to generate a LiDAR contour with respect to a fixed structure and a variable structure, which are located at the roadside. In particular, the LiDAR sensor 20 may be configured to generate a LiDAR contour for each layer which emits a laser beam. Since the LiDAR sensor 20 is a device which is commonly and widely used, a detailed description thereof will be omitted. An exemplary embodiment of the present disclosure is exemplified as, but not limited to, a LiDAR sensor. For example, an exemplary embodiment of the present disclosure may be implemented using a radar sensor, an ultrasonic sensor, an infrared sensor, or the like.

Furthermore, the controller 30 may be configured to perform overall control such that the respective components perform their respective functions. The controller 30 may be implemented in the form of hardware or software or in the form of a combination thereof. Preferably, the controller 30 may be implemented as, but not limited to, a microprocessor. The controller 30 may be configured to perform control required in a process of detecting a location of an autonomous vehicle using both of a LiDAR contour for a fixed structure and a LiDAR contour for a variable structure.

When storing a periodically calculated offset as a reference offset in the storage 10, the controller 30 may be configured to determine whether to store (e.g., update) the offset based on a reliability value received from a lane matching system (not shown) mounted within the autonomous vehicle at a time when the offset is calculated. In other words, when the reliability value is greater than a threshold, the controller 30 may be configured to store the calculated offset as a reference offset in the storage 10. In particular, the reliability value may be a value that corresponds to an error between a location of a real lane and a location of an estimated lane and may have a higher value as a real location is closer to an estimated location.

For example, the controller 30 may be configured to calculate a first offset at a first time. When a reliability value that corresponds to the first time is greater than a reference value, the controller 30 may be configured to store the first offset as a first reference offset in the storage 10. Thereafter, the controller 30 may be configured to calculate a second offset at a second time. When a reliability value that corresponds to the second time is less than the reference value, the controller 30 may be configured to delete the second offset. Thereafter, the controller 30 may be configured to calculate a third offset at a third time. When a reliability value that corresponds to the third time is greater than the reference value, the controller 30 may be configured to update the first reference offset stored in the storage 10 to a third reference offset.

The controller 30 may include an offset calculator 31 and a positioning device 32. The offset calculator 31 and the positioning device 32 may be components of the controller 30 and may be implemented such that the controller 30 executes a function of the offset calculator 31 and a function of the positioning device 32.

Figure 2:
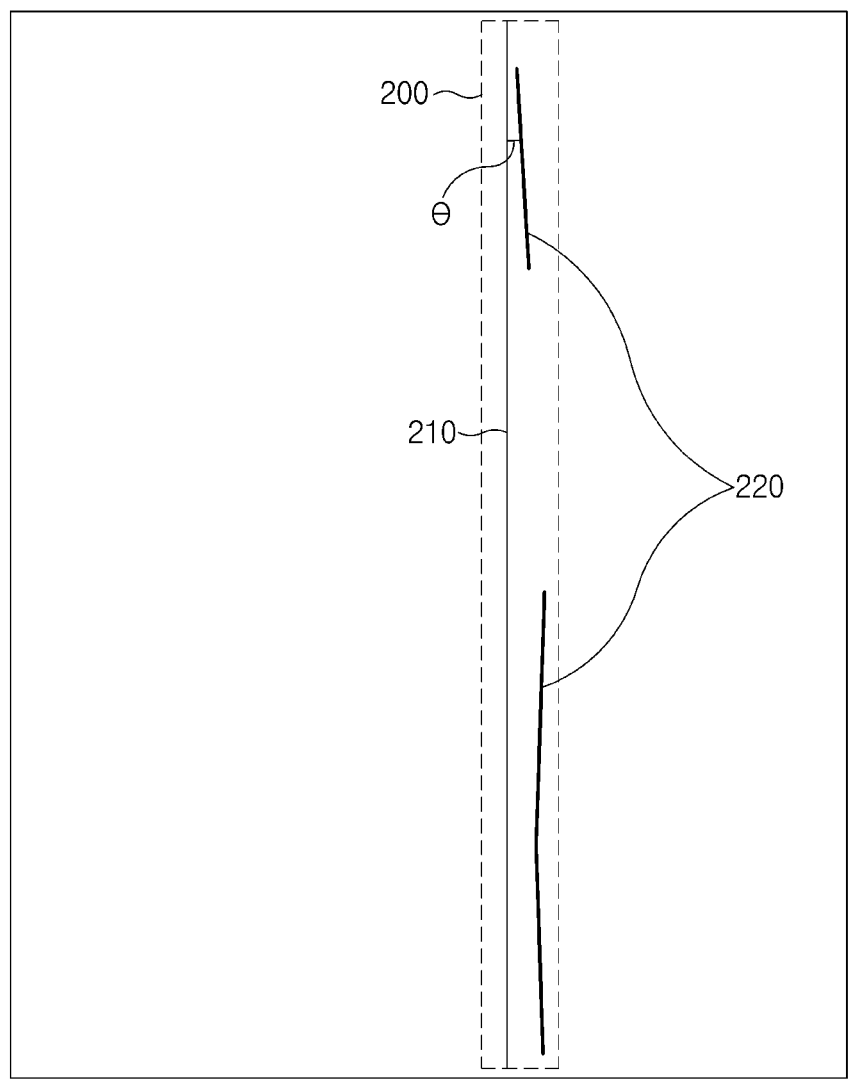
FIG. 2 is a drawing illustrating the result of matching a fixed structure and a LiDAR contour at an offset calculator included in an apparatus for recognizing a location in an autonomous vehicle according to an exemplary embodiment of the present disclosure.

Hereinafter, a description will be given in detail of the function of the offset calculator 31 with reference to FIGS. 2 to 5. FIG. 2 is a drawing illustrating the result of matching a fixed structure and a LiDAR contour at an offset calculator included in an apparatus for recognizing a location in an autonomous vehicle according to an exemplary embodiment of the present disclosure. FIG. 2 illustrates a location of a fixed structure and a location of a LiDAR contour, which are matched with each other, on one screen.

In FIG. 2, reference numeral 210 indicates a fixed structure included in a detailed map, and reference numeral 220 indicates a LiDAR contour matched with the fixed structure 210. In particular, a matching window 200 may refer to a region for selecting the LiDAR contour 220, which is located within a particular distance from a reference location, where a heading angle offset θ is less than a threshold. An offset calculator 31 of FIG. 1 may be configured to filter the LiDAR contour 220, which is located within a threshold distance from the fixed structure 210, where the heading angle offset θ is less than the threshold value, based on the matching window 200. In other words, the offset calculator 31 may be configured to detect the LiDAR contour 220 matched with the fixed structure 210 using the matching window 200. In particular, the matching window 200 may be varied in size according to an intention of a designer.

Herein, the heading angle offset θ may refer to an angle between the fixed structure 210 and the LiDAR contour 220. The LiDAR contour 220 may include a LiDAR contour for a fixed structure located at the roadside and a LiDAR contour for a variable structure located at the roadside.

Figure 3:
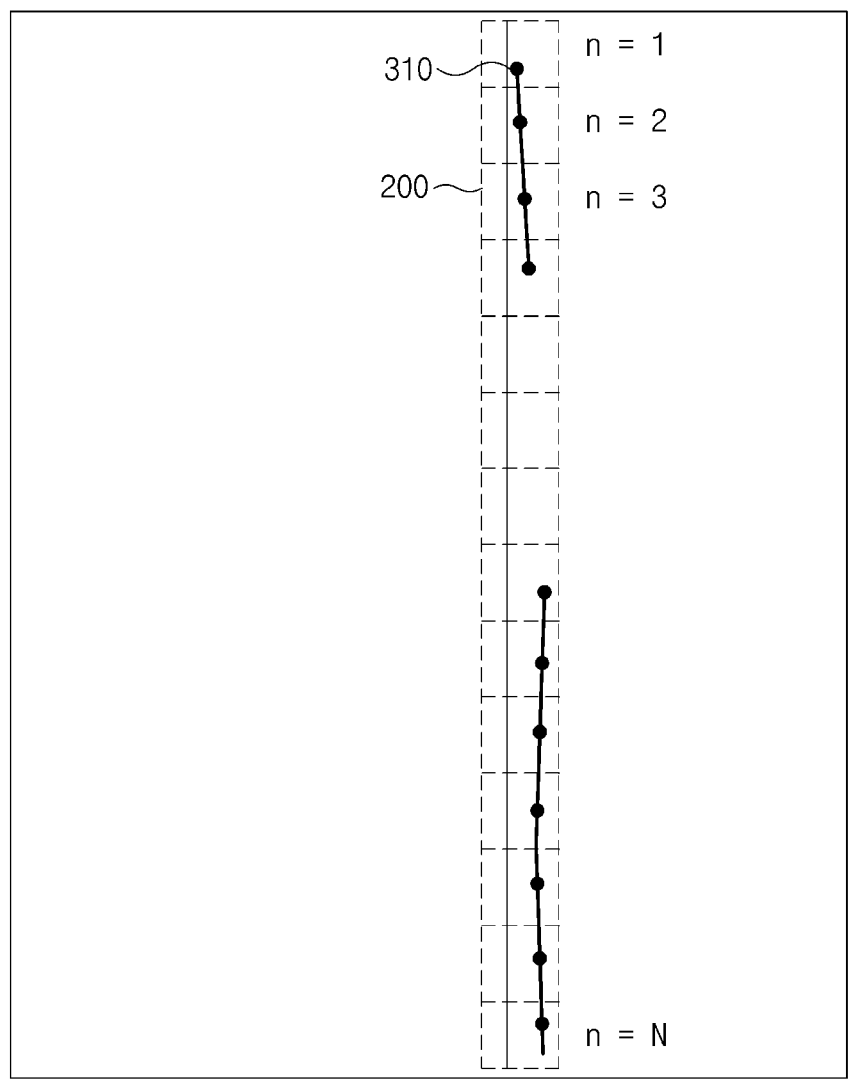
FIG. 3 is a drawing illustrating a process of determining a representative point for each window region of a matching window at an offset calculator included in an apparatus for recognizing a location in an autonomous vehicle according to an exemplary embodiment of the present disclosure.

FIG. 3 is a drawing illustrating a process of determining a representative point for each window region of a matching window at an offset calculator included in an apparatus for recognizing a location in an autonomous vehicle according to an exemplary embodiment of the present disclosure. As shown in FIG. 3, an offset calculator 31 included in an apparatus 100 for recognizing a location in an autonomous vehicle according to an exemplary embodiment of the present disclosure may be configured to divide a matching window 200 into N window regions, each of which has a particular size. In particular, N denotes the number of the divided window regions. Each of the divided window regions may be, but is not limited to, a square.

The offset calculator 31 may be configured to determine a representative point 310 of a LiDAR contour for each layer in each of the divided window regions. In particular, the offset calculator 31 may be configured to determine a point at which a horizontal line passing through the center of each window region and a LiDAR contour are met as a representative point or determine the center of a LiDAR contour included in each window region as a representative point.

Figure 4:
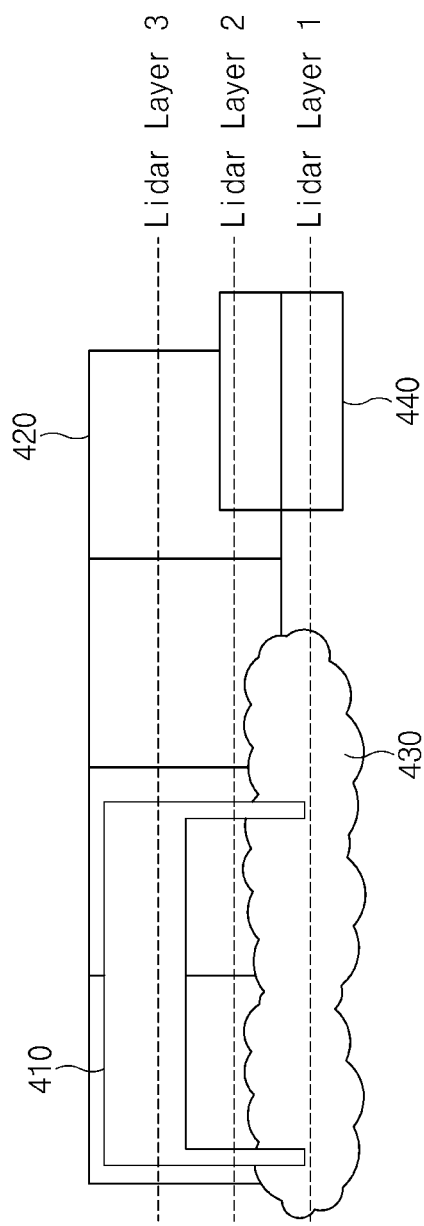
FIG. 4 is a drawing illustrating a measurement layer of a LiDAR sensor included in an apparatus for recognizing a location in an autonomous vehicle according to an exemplary embodiment of the present disclosure.

FIG. 4 is a drawing illustrating a measurement layer of a LiDAR sensor included in an apparatus for recognizing a location in an autonomous vehicle according to an exemplary embodiment of the present disclosure. As shown in FIG. 4, a LiDAR sensor 20 included in an apparatus 100 for recognizing a location in an autonomous vehicle according to an exemplary embodiment of the present disclosure may have, for example, layer 1 with a lowest measurement level, layer 2 with a middle measurement level, and layer 3 with a highest measurement level. The number of layers may be varied according to an intention of a designer.

In FIG. 4, reference numeral 410 indicates a banner as a variable structure, reference numeral 420 indicates soundproof walls as a fixed structure, reference numeral 430 indicates bushes as a variable structure, and reference numeral 440 indicates objects which are piled up, as a variable structure. The LiDAR sensor 20 may be configured to sense a variable structure and a fixed structure, each of which has the structure shown in FIG. 4. A LiDAR contour generated based on the sensed variable structure and fixed structure is shown in FIG. 5.

Figure 5:
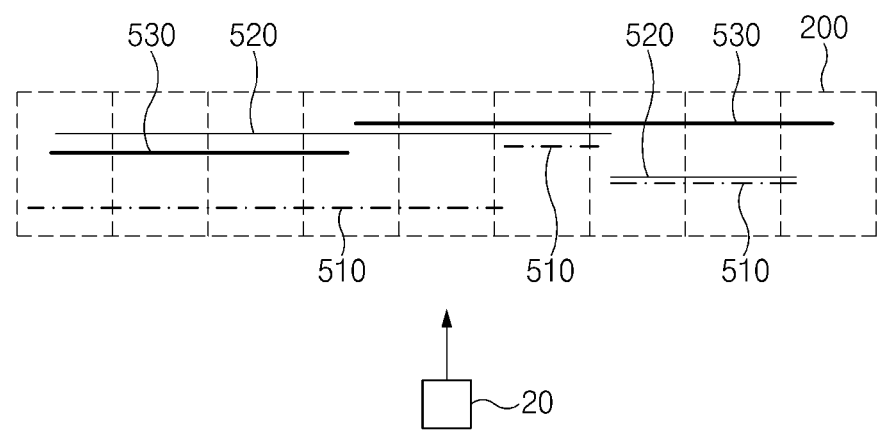
FIG. 5 is a drawing illustrating a LiDAR contour for a structure of FIG. 4, generated by a LiDAR sensor included in an apparatus for recognizing a location in an autonomous vehicle according to an exemplary embodiment of the present disclosure.

FIG. 5 is a drawing illustrating a LiDAR contour generated by a LiDAR sensor included in an apparatus for recognizing a location in an autonomous vehicle according to an exemplary embodiment of the present disclosure. FIG. 5 is a drawing having a point of view of the direction from the top to the bottom. In FIG. 5, reference numeral 510 indicates a LiDAR contour corresponding layer 1 of a LiDAR sensor 20 of FIG. 1, reference numeral 520 indicates a LiDAR contour corresponding layer 2 of the LiDAR sensor 20, and reference numeral 530 indicates a LiDAR contour corresponding layer 3 of the LiDAR sensor 20.

A LiDAR contour obtained on layer 1 by the LiDAR sensor 20 may include a LiDAR contour for bushes 430 of FIG. 4, a LiDAR contour for soundproof walls 420 of FIG. 4, and a LiDAR contour for things 440 which are piled up. A LiDAR contour obtained on layer 2 may include a LiDAR contour for the soundproof walls 420 and a LiDAR contour for the objects 440 which are piled up. A LiDAR contour obtained on layer 3 may include a LiDAR contour for a banner 410 of FIG. 4 and a LiDAR contour for the soundproof walls 420.

As may be observed in FIG. 5, the LiDAR sensor 20 may be configured to generate LiDAR contours that correspond to a plurality of layers for each window region while driving. In particular a conventional scheme of selecting the LiDAR contour corresponding to the soundproof walls 420 included in a detailed map and using only the selected LiDAR contour may fail to detect a location of an autonomous vehicle at high accuracy due to the insufficiency of a matching set. However, the following scheme is disclosed to use all of LiDAR contours in an exemplary embodiment of the present disclosure.

An offset calculator 31 of FIG. 1 may be configured to fuse location offsets of representative points on a LiDAR contour for each layer in respective window regions to generate a location offset representing each window region. In particular, the offset calculator 31 may be configured to generate, for example, one location offset representing each window region using Equation 1 below.

$$(x_n, y_n, \theta_n) = \sum_{m=1}^{M} (w_m(x_{nm} - x'_{nm}), w_m(y_{nm} - y'_{nm}), w_m(\theta_{nm} - \theta'_{nm}))$$ Equation 1 wherein, x denotes the longitudinal offset of the LiDAR contour 220 on the basis of the fixed structure 210, y denotes the lateral offset of the LiDAR contour 220 on the basis of the fixed structure 210, and θ denotes the heading angle offset of the LiDAR contour 220 on the basis of the fixed structure 210.

Furthermore, n denotes the number of the divided window regions or the index of the divided window regions, and m denotes the layer of the LiDAR contour (the measurement layer of the LiDAR sensor 20). In addition, ($x_{nm}'$, $y_{nm}'$, $\theta_{nm}'$) may indicate the reference offset of the representative point for each layer in each window region, and ($x_{nm}$, $y_{nm}$, $\theta_{nm}$) may indicate the offset of the representative point for each layer in each window region. In particular, the reference offset may indicate a value obtained at a previous time, and the offset may indicate a value obtained at a current time.

Thereafter, the offset calculator 31 may be configured to fuse location offsets representing respective window regions to generate one location offset representing the entire window region 200. In particular, the offset calculator 31 may be configured to generate, for example, the one location offset representing the entire window region 200 using Equation 2 below.

$$(x, y, \theta) = \sum_{n=1}^{N} (w_n x_n, w_n y_n, w_n \theta_n)$$ Equation 2

The location offset generated using Equation 2 above may represent one roadside structure. The offset calculator 31 may be configured to generate a location offset representing each roadside structure in such a manner. In particular, a positioning device 32 of FIG. 1 may be configured to correct a current location of an autonomous vehicle based on the location offset representing the roadside structure and detect a more accurate location.

Meanwhile, the offset calculator 31 may be configured to fuse location offsets representing respective roadside structures based on the Gaussian weighted sum or the average sum, which is well-known and commonly used, to generate a final location correction value. Particularly, the positioning device 32 may be configured to correct a current location of the autonomous vehicle based on the final location correction value and detect a more accurate location.

Figure 6:
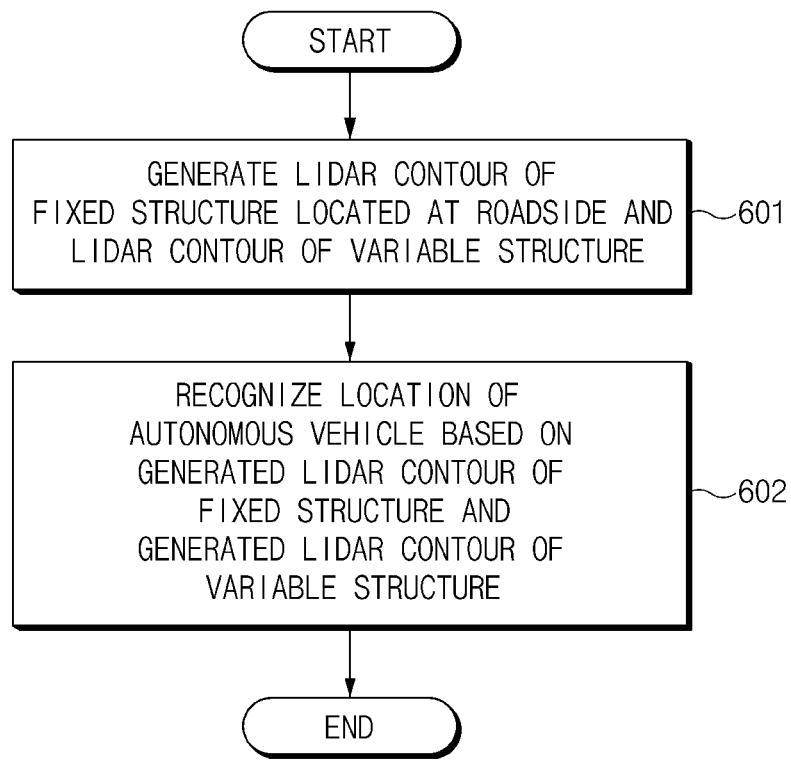
FIG. 6 is a flowchart illustrating a method for recognizing a location in an autonomous vehicle according to an exemplary embodiment of the present disclosure.

FIG. 6 is a flowchart illustrating a method for recognizing a location in an autonomous vehicle according to an exemplary embodiment of the present disclosure. First of all, in operation 601, a LiDAR sensor 20 of FIG. 1 may be configured to generate a LiDAR contour of a fixed structure located at the roadside and a LiDAR contour of a variable structure. In operation 602, a controller 30 of FIG. 1 may be configured to detect a location of the autonomous vehicle based on the LiDAR contour of the fixed structure and the LiDAR contour of the variable structure, which are generated by the LiDAR sensor 20.

Figure 7:
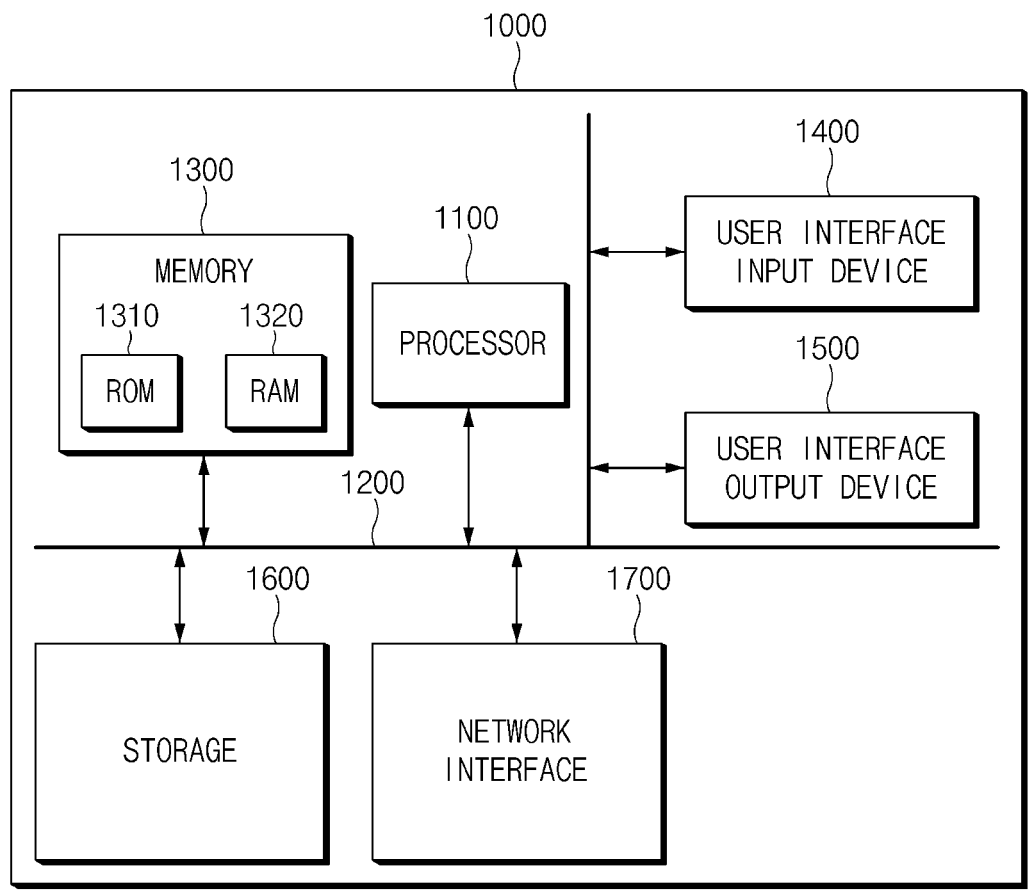
FIG. 7 is a block diagram illustrating a computing system for executing a method for recognizing a location in an autonomous vehicle according to an exemplary embodiment of the present disclosure.

FIG. 7 is a block diagram illustrating a computing system for executing a method for recognizing a location in an autonomous vehicle according to an exemplary embodiment of the present disclosure. Referring to FIG. 7, the method for recognizing the location in the autonomous vehicle according to an exemplary embodiment of the present disclosure may be implemented by means of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for recognizing the location in the autonomous vehicle according to an exemplary embodiment of the present disclosure may detect a location of the autonomous vehicle using both of a LiDAR contour for a fixed structure and a LiDAR contour for a variable structure without the necessity of classifying whether a LiDAR contour obtained by a LiDAR sensor is the LiDAR contour for the fixed structure included in a detailed map or the LiDAR contour for the variable structure which is not included in the detailed map, thus enhancing positioning accuracy.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. An apparatus for recognizing a location in an autonomous vehicle, comprising:
   a light detection and ranging (LiDAR) sensor configured to generate a LiDAR contour of a fixed structure located at the roadside and a LiDAR contour of a variable structure;
   a controller configured to recognize a location of the autonomous vehicle based on the LiDAR contour of the fixed structure and the LiDAR contour of the variable structure, the LiDAR contours being generated by the LiDAR sensor; and
   a storage configured to a map including the fixed structure and a reference offset of a LiDAR contour for each layer in each of a plurality of window regions,
   wherein the controller includes:
   an offset calculator configured to:
      detect a LiDAR contour for each layer matched with the fixed structure using a matching window;
      divide the matching window into a plurality of window regions;
      determine a representative point of a LiDAR contour for each layer in each of the plurality of window regions;
      generate a location offset representing each of the plurality of window regions by fusing offsets of the representative points;
      generate one location offset representing one roadside structure by fusing location offsets representing the plurality of window regions; and
      generate a final location correction value by fusing location offsets representing respective roadside structures; and
   a positioning device configured to detect a current location of the autonomous vehicle based on the final location correction value.

2. The apparatus of claim 1, wherein the controller is configured to determine whether to store the reference offset based on a reliability value obtained at a time when the reference offset is generated.

3. The apparatus of claim 2, wherein the reliability value is a value that corresponds to an error between a location of an actual lane and a location of an estimated lane.

4. The apparatus of claim 1, wherein the offset calculator is configured to calculate a location offset of each of the representative points based on a location of the fixed structure on the map.

5. The apparatus of claim 1, wherein the offset calculator is configured to equally divide the matching window into the plurality of window regions.

6. The apparatus of claim 1, wherein the offset calculator is configured to determine a point at which a horizontal line passing through the center of each of the plurality of window regions and a LiDAR contour in the window region are met as a representative point.

7. The apparatus of claim 1, wherein the offset calculator is configured to determine the center of a LiDAR contour in each of the plurality of window regions as a representative point.

8. A method for recognizing a location in an autonomous vehicle, comprising:

generating, by a LiDAR sensor, a LiDAR contour of a fixed structure located at the roadside and a LiDAR contour of a variable structure;

detecting, by a controller, a location of the autonomous vehicle based on the generated LiDAR contour of the fixed structure and the generated LiDAR contour of the variable contour; and storing, by a storage, a map including the fixed structure and a reference offset of a LiDAR contour for each layer in each of a plurality of window regions, wherein the detecting of the location of the autonomous vehicle includes:

detecting, by the controller, a LiDAR contour for each layer matched with the fixed structure using a matching window;

dividing, by the controller, the matching window into a plurality of window regions determining, by the controller, a representative point of a LiDAR contour for each layer in each of the plurality of window regions;

generating by the controller, a location offset representing each of the plurality of window regions by fusing offsets of the representative points;

generating, by the controller, one location offset representing one roadside structure by fusing location offsets representing the plurality of window regions;

generating, by the controller, a final location correction value by fusing location offsets representing respective roadside structures; and detecting, by the controller, a current location of the autonomous vehicle based on the final location correction value.

9. The method of claim 8, wherein the storing of the reference offset includes:

storing, by the storage, the reference offset, when a reliability value obtained at a time when the reference offset is generated is greater than a threshold.

10. The method of claim 9, wherein the reliability value is a value that corresponds to an error between a location of an actual lane and a location of an estimated lane.

11. The method of claim 8, wherein the generating of the location offset representing each of the plurality of window regions includes:

calculating, by the controller, a location offset of each of the representative points based on a location of the fixed structure on the detailed map.

12. The method of claim 8, wherein the dividing of the matching window into a plurality of window regions includes:

equally dividing, by the controller, the matching window into the plurality of window regions.

13. The method of claim 8, wherein the determining of the representative point includes:

determining, by the controller, a point at which a horizontal line passing through the center of each of the plurality of window regions and a LiDAR contour in the window region are met as a representative point.

14. The method of claim 8, wherein the determining of the representative point includes:

determining, by the controller, the center of a LiDAR contour in each of the plurality of window regions as a representative point.

\* \* \* \* \*